(12) United States Patent
Jones et al.

(10) Patent No.: US 8,583,700 B2
(45) Date of Patent: Nov. 12, 2013

(54) CREATION OF DATE WINDOW FOR RECORD SELECTION

(75) Inventors: Steven B. Jones, Poughkeepsie, NY (US); Anthony T. Sofia, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 12/348,071

(22) Filed: Jan. 2, 2009

(65) Prior Publication Data
US 2010/0174757 A1    Jul. 8, 2010

(51) Int. Cl.
*G06F 17/30* (2006.01)

(52) U.S. Cl.
USPC .......................... 707/803; 707/804; 707/805

(58) Field of Classification Search
None
See application file for complete search history.

(56) References Cited

U.S. PATENT DOCUMENTS

| | | | |
|---|---|---|---|
| 5,155,858 A | 10/1992 | DeBruler et al. | |
| 5,261,045 A * | 11/1993 | Scully et al. | 715/751 |
| 5,600,837 A | 2/1997 | Artieri | |
| 5,903,845 A * | 5/1999 | Buhrmann et al. | 455/461 |
| 5,937,205 A | 8/1999 | Mattson et al. | |
| 6,457,062 B1 * | 9/2002 | Pivowar et al. | 709/248 |
| 6,604,079 B1 * | 8/2003 | Ruvolo et al. | 705/7.15 |
| 6,728,792 B2 | 4/2004 | Wagner | |
| 6,874,144 B1 | 3/2005 | Kush | |
| 7,051,330 B1 | 5/2006 | Kaler et al. | |
| 7,181,689 B2 * | 2/2007 | Mock et al. | 715/703 |
| 7,206,922 B1 | 4/2007 | Steiss | |
| 2002/0065867 A1 | 5/2002 | Chauvel | |
| 2004/0039884 A1 | 2/2004 | Li | |
| 2004/0162941 A1 | 8/2004 | Aigo | |
| 2004/0268270 A1 * | 12/2004 | Hill et al. | 715/963 |
| 2005/0071841 A1 | 3/2005 | Hoflehner et al. | |
| 2005/0149936 A1 | 7/2005 | Pilkington | |
| 2006/0099945 A1 * | 5/2006 | Helvick | 455/432.3 |
| 2006/0117316 A1 | 6/2006 | Cismas et al. | |
| 2006/0294522 A1 | 12/2006 | Havens | |
| 2007/0016646 A1 * | 1/2007 | Tendjoukian et al. | 709/206 |
| 2007/0061712 A1 * | 3/2007 | Bodin et al. | 715/523 |
| 2008/0027955 A1 * | 1/2008 | May et al. | 707/100 |
| 2008/0307323 A1 * | 12/2008 | Coffman et al. | 715/753 |

FOREIGN PATENT DOCUMENTS

EP    1217532 A2 *   6/2002

OTHER PUBLICATIONS

U.S. Appl. No. 12/348,075; Final Office Action; dated Aug. 5, 2011; 9 pages.
U.S. Appl. No. 12/348,075; Non-Final Office Action; dated Apr. 14, 2011; 11 pages.

* cited by examiner

*Primary Examiner* — Debbie Le
(74) *Attorney, Agent, or Firm* — Cantor Colburn LLP; William A. Kinnaman, Jr.

(57) ABSTRACT

A method for creating a date window for record selection. The method includes defining a set of parameters for calculating a date window for record selection, automatically detecting a current date, receiving input values corresponding to the defined set of parameters, from a user via a user interface, calculating and generating the date window based on the input values and the current date detected, and providing the generated date window and data records associated with the generated date window to the user via the user interface.

9 Claims, 3 Drawing Sheets

| UNIT | NUMBER TO GO BACK | NUMBER TO OBTAIN | CURRENT DAY | RESULT |
|---|---|---|---|---|
| ByDay | 0 | 1 | April 1, 2008 | April 1, 2008 |
| ByDay | 1 | 1 | April 1, 2008 | March 31, 2008 |
| ByWeek | 1 | 1 | April 1, 2008 | Week of March 24, 2008 |
| ByMonth | 3 | 3 | April 1, 2008 | 1st Quarter of 2008 |
| ByMonth | 3 | 3 | July 1, 2008 | 2nd Quarter of 2008 |
| ByMonth | 6 | 3 | July 1, 2008 | 1st Quarter of 2008 |

FIG. 2

CREATION OF DATE WINDOW FOR RECORD SELECTION

BACKGROUND

The present invention relates to creating a date window via a computer system, and more specifically, to creating date window based on the detection of a current date via the computer system, and input data input by a user of the computer system.

Today, using computer systems, users require the ability to select data records based on date windows manually created by the user. Specifically, the user manually computes date ranges and inputs the computed date ranges into the computer system to retrieve data records corresponding to the computed date ranges.

Manual computation by a user can be very time-consuming. Therefore, there is a desire for a more efficient way to create a data window and to retrieve data records associated with the created data window.

SUMMARY

According to one embodiment, the present invention provides a method for creating a date window based on input values entered by a user and the current date which is automatically detected by the computer system.

According to one embodiment, a method for creating a date window for data record selection is provided. The method includes defining a set of parameters for calculating a date window for record selection, automatically detecting a current date, receiving input values corresponding to the defined set of parameters, from a user via a user interface, calculating and generating the date window based on the input values and the current date detected, and providing the generated date window and data records associated with the generated date window to the user via the user interface.

According to another embodiment of the present invention, a computer-implemented method for creating a date window for record selection is provided. The method includes defining a set of parameters for calculating a date window for record selection, automatically detecting a current date, receiving input values corresponding to the defined set of parameters, from a user via a user interface, calculating and generating the date window based on the input values and the current date detected, and providing the generated date window and data records associated with the generated date window to the user via the user interface.

According to another embodiment of the present invention, a computer program product comprising a computer useable medium including a computer readable program, wherein the computer readable program when executed on a computer causes the computer to implement a method for creating a date window for record selection is provided. The method includes defining a set of parameters for calculating a date window for record selection, automatically detecting a current date, receiving input values corresponding to the defined set of parameters, from a user via a user interface, calculating and generating the date window based on the input values and the current date detected, and providing the generated date window and data records associated with the generated date window to the user via the user interface.

According to another embodiment of the present invention, a computer-implemented method for obtaining a date window for data record selection is provided. The method includes inputting input values via a user interface, the input values corresponding to a predefined set of parameters for data window creation, and receiving, via the user interface, a date window generated based on the input values and a current date detected via the computer, and data records corresponding to the date window generated.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a table illustrating various examples of input values input by a user via a user interface in accordance with an embodiment of the present invention.

DETAILED DESCRIPTION

Figure 1:
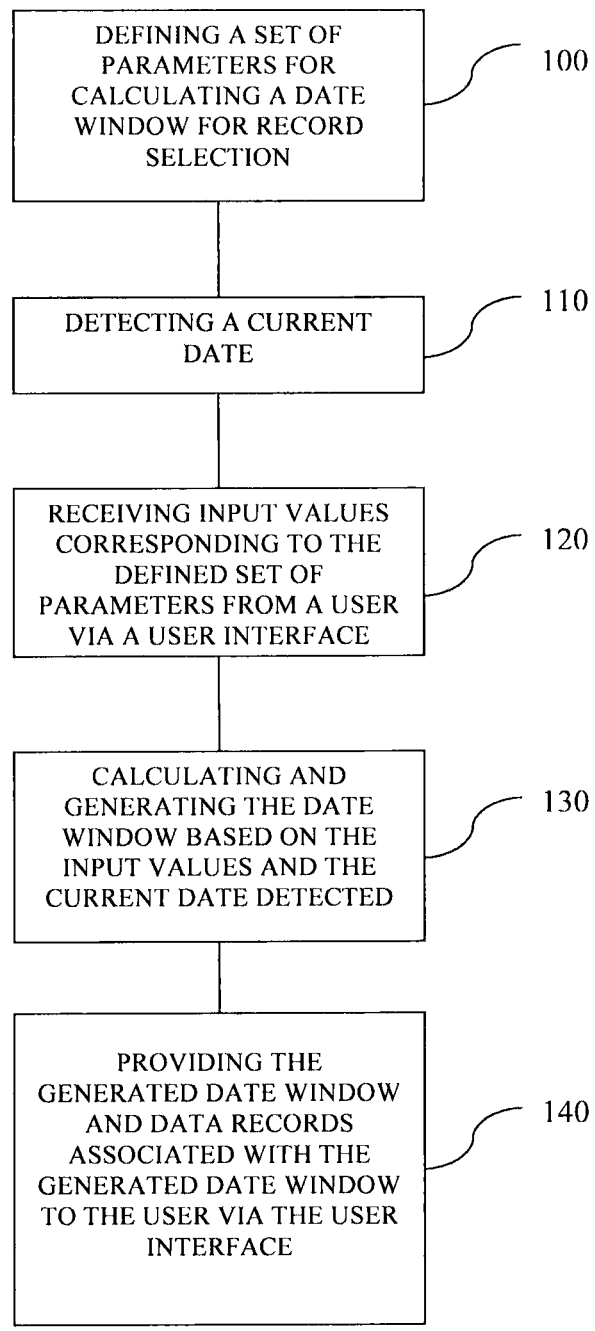
FIG. 1 is a flow chart illustrating a method for creating a date window that can be implemented within embodiments of the present invention.
Figure 3:
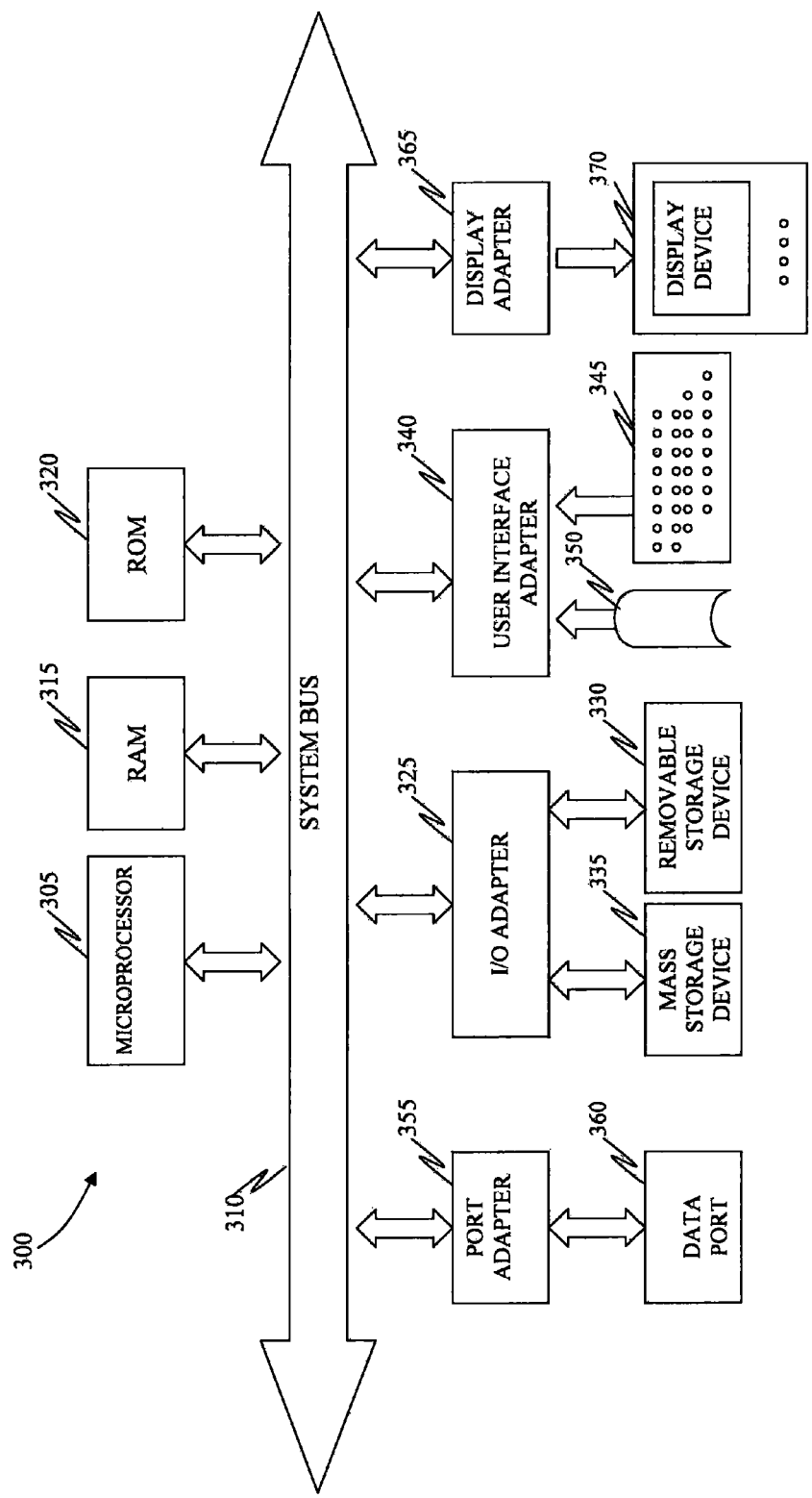
FIG. 3 is a schematic block diagram of a general-purpose computer suitable for practicing the present invention embodiments.

With reference now to FIG. 1, there is a flowchart illustrating a method for creating a date window that can be implemented via a computer system 300 (as shown in FIG. 3, for example) within embodiments of the present invention.

In FIG. 1, in operation 100, a set of parameters are defined for calculating a date window for record selection. According to one embodiment, the defined set of parameters includes at least one of a specified unit to be specified by a user, a number of units to move backwards from a current unit and a number of units to be obtained. Thus, the defined set of parameters enable a user the ability to specify values corresponding to the defined set of parameters. According to an embodiment, the number of units to go backwards from a current unit represents a start of the date window, and the number of units to be obtained represents the length of the date window. According to an embodiment of the present invention, the unit may be a day, week, month or year, for example. However, the present invention is not limited hereto and may vary, as necessary. Further, the present invention is not limited to defining a particular set of parameters and may vary, as necessary.

Further, according to an embodiment of the present invention, the current unit, the number of units to go backwards from the current unit, and the number of units to be obtained are of a same type of unit as the specified unit. For example, if the specified unit is a day, then the current unit, the number of units to go backwards from the current unit and the number of units to be obtained are all in terms of days.

From operation 100, the process moves to operation 110, where a current date is automatically detected by the computer system. Therefore, the user is not required to manually enter the current date. According to an embodiment of the present invention, the date window for record selection is based on the current date detected by the computer system. From operation 110, the process moves to operation 120, where when a user desires to obtain data records from the computer system and the defined set of parameters are displayed to the user via a user interface such as a graphical user interface (GUI), for example. The user enters input values, via the user interface into the computer system. The computer system receives the input values corresponding to the defined set of parameters from the user.

From operation 120, the process moves to operation 130, where a date window is calculated and generated based on the input values and the current date detected by the system. Examples of date window calculations are depicted in FIG. 2 (to be described below).

From operation 130, the process moves to operation 140, where the generated date window and data records associated with the generated date window are provided to the user via the user interface.

FIG. 2 is a table illustrating various examples of input values as input by the user, and corresponding to the defined set of parameters. As shown in FIG. 2, the defined set of parameters includes a unit, the number of units to go backwards from the current unit, the number of units to obtain, the current date detected by the computer system and a generated result (i.e., the calculated date window). The present invention is not limited to hereto and the set of parameters may vary as necessary.

As shown in FIG. 2, in the first example, if a user inputs (unit, number of units to go back, number of units to obtain), for example, (ByDay, 0, 1) and the current date is Apr. 1, 2008, the computer system calculates and generates a date window including only the current date (i.e., Apr. 1, 2008) and the user receives the generated date window and associated data records only for the current date. In another example, if the user inputs (ByDay, 1, 1) and the current date is Apr. 1, 2008, the computer system calculates and generates a date window including only the previous date (i.e., Mar. 31, 2008). In yet another example, if the user inputs (ByWeek, 1, 1) and the current date is Apr. 1, 2008, the computer system calculates and generates a date window including only the previous week (i.e., the week of Mar. 24, 2008). According to an embodiment of the present invention, the computer system goes backward in full units from the current unit. In the above example, since the current unit is "ByWeek" and the user desires to go backwards one week and obtain one week of data records, the computer system returns the previous full week (i.e., the week of Mar. 24, 2008) of data records.

In another example, if the user inputs (ByMonth, 3, 3) and the current date is Apr. 1, 2008, the computer system calculates and generates a data window including the First Quarter of 2008. On the other hand, if the user inputs (ByMonth, 3, 3) and the current date is Jul. 1, 2008, then the computer system calculates and generates a date window including the Second Quarter of 2008. In yet another example, if the user inputs (ByMonth, 6, 3) and the current date is Jul. 1, 2008, the computer system calculates and generates a date window including the First Quarter of 2008.

According to another embodiment of the present invention, the input values entered by the user may be stored in a storage medium for subsequent use such that the same parameters may be used for subsequent executions allowing the user to gather different data for different dates without having to redefine the parameters. In this embodiment, the received input values corresponding to the defined set of parameters are stored and the user determines a frequency for periodically calculating and generating a date window based on the stored input values and the current date as detected. The computer system then calculate and generates a date window based on the determined frequency and provides the user with the generated date window and associated data records based on the determined frequency. For example, a user may set up a program to run with the parameters (BYDAY, 1, 1) and if the user desires to received data on a daily basis, then each day the user will receive data records from the previous day such that if the user ran the program today, the user would receive yesterday's data and if the user runs the program tomorrow, the user will receives today's data. The current embodiment provides the advantage that the user does not have to perform manual calculations or redefine the parameters each time the program is ran and gives the ability for the same instance of a given program to be run at different times of the year to generate different reports. Thus, cutting down the amount of maintenance required for users who have strong requirements on not changing the inputs to programs once they are in a production environment, for example.

Embodiments of the present invention create date windows based on the current date detected by the computer system and input values entered by a user. Therefore, the present invention provides a more efficient way for user to obtain date windows and associated data records.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

Generally, the method for creating a date window for record selection described herein is practiced with a general-purpose computer and the method may be coded as a set of instructions on removable or hard media for use by the general-purpose computer. FIG. 3 is a schematic block diagram of a general-purpose computer suitable for practicing the present invention embodiments. In FIG. 3, computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 330, fed through data port 360 or typed in using keyboard 345.

In view of the above, the present method embodiment may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for creating a date window for record selection, the method comprising:
defining by a computer a set of parameters for calculating a date window for record selection, wherein the defined set of parameters comprises a number of units to backwards from a current unit and a number of units to be obtained, wherein the number of units to go backwards from the current unit represents a start of the date window and the number of units to be obtained represents a length of the date window;
automatically detecting by the computer a current date;
receiving by the computer input values corresponding to the defined set of parameters, from a user via a user interface;
calculating and generating by the computer the date window based on the input values and the current date detected, wherein the start of the date window is determined by the received input value corresponding to the number of units to go backwards from the current unit and the length of the date window is determined by the received input value corresponding to the number of units to be obtained;
providing by the computer the generated date window and data records associated with the generated date window to the user via the user interface;
storing by the computer the received input values corresponding to the defined set of parameters;
determining by the computer a periodic frequency for calculating and generating a date window based on the stored, received input values and the current date detected;
automatically calculating by the computer and generating a date window based on the determined periodic frequency; and
automatically providing by the computer to the user the calculated, generated date window and associated data records, based on the determined periodic frequency.

2. The computer-implemented method of claim 1, wherein the defined set of parameters comprises a specified unit.

3. The computer-implemented method of claim 2, wherein the specified unit comprises a type comprising one of a day, week, month or year, and wherein the current unit, the number of units to move backwards from the current unit and the number of units to be obtained are of the same type as the specified unit.

4. A computer program product comprising a non-transitory computer useable medium including a computer readable program, wherein the computer readable program when executed on a computer causes the computer to implement a method for creating a date window for record selection, the method comprising:
defining a set of parameters for calculating a date window for record selection, wherein the defined set of parameters comprises a number of units to go backwards from a current unit and a number of units to be obtained, wherein the number of units to go backwards from the current unit represents a start of the date window and the number of units to be obtained represents a length of the date window;
automatically detecting a current date;
receiving input values corresponding to the defined set of parameters, from a user via a user interface;
calculating and generating the date window based on the input values and the current date detected, wherein the start of the date window is determined by the received input value corresponding to the number of units to go backwards from the current unit and the length of the date window is determined by the received input value corresponding to the number of units to be obtained;
providing the generated date window and data records associated with the generated date window to the user via the user interface;
storing the received input values corresponding to the defined set of parameters;
determining a periodic frequency for calculating and generating a date window based on the stored, received input values and the current date detected;

automatically calculating and generating a date window based on the determined periodic frequency; and automatically providing the user with the calculated, generated date window and associated data records, based on the determined periodic frequency.

5. The computer program product of claim 4, wherein the defined set of parameters comprises a specified unit.

6. The computer program product of claim 5, wherein the specified unit comprises a type comprising one of a day, week, month or year, and wherein the current unit, the number of units to move backwards from the current unit and the number of units to be obtained are of the same type as the specified unit.

7. A computer-implemented method for creating a date window for record selection, the method comprising:

defining by a computer a set of parameters for calculating a date window for record selection, wherein the defined set of parameters comprises a number of units to go backwards from a current unit and a number of units to be obtained, wherein the number of units to go backwards from the current unit represents a start of the date window and the number of units to be obtained represents a length of the date window;

automatically detecting by the computer a current date;

receiving by the computer input values corresponding to the defined set of parameters, from a user via a user interface; and calculating and generating by the computer the date window based on the input values and the current date detected, wherein the start of the date window is determined by the received input value corresponding to the number of units to go backwards from the current unit and the length of the date window is determined by the received input value corresponding to the number of units to be obtained.

8. The computer-implemented method of claim 7, wherein the defined set of parameters comprises a specified unit.

9. The computer-implemented method of claim 8, wherein the specified unit comprises a type comprising one of a day, week, month or year, and wherein the current unit, the number of units to move backwards from the current unit and the number of units to be obtained are of the same type as the specified unit.

* * * * *